H. B. BARTLETT.
WEIGHING SCALE.
APPLICATION FILED OCT. 3, 1919.
1,400,933.                                  Patented Dec. 20, 1921.
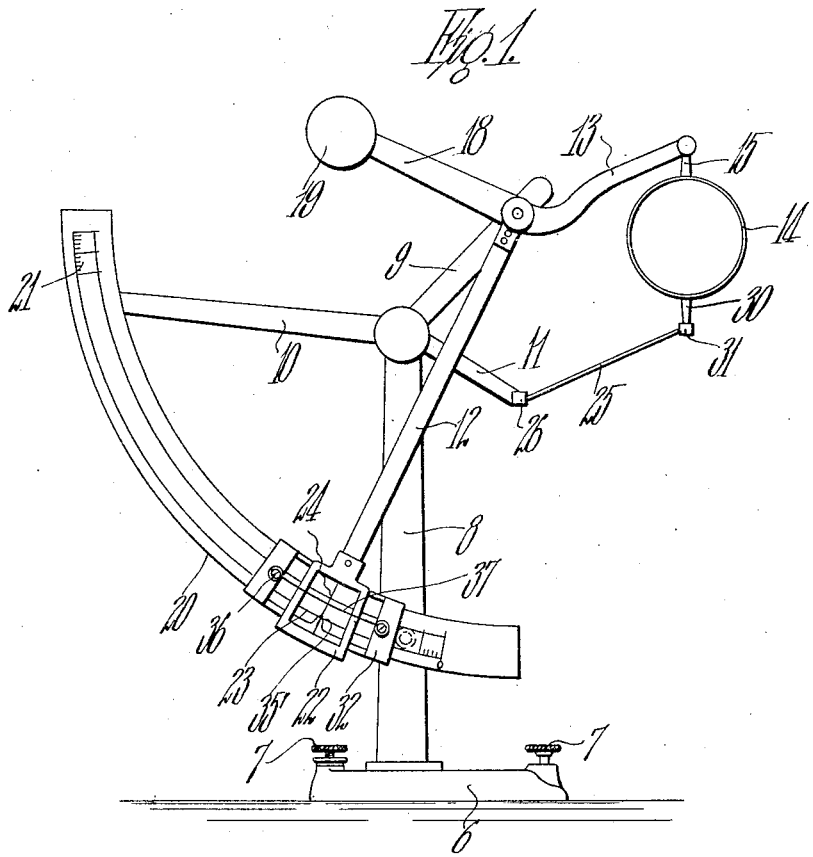
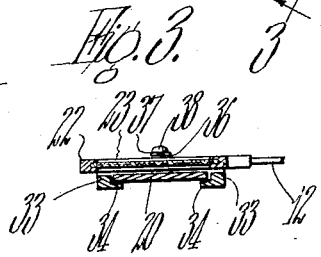
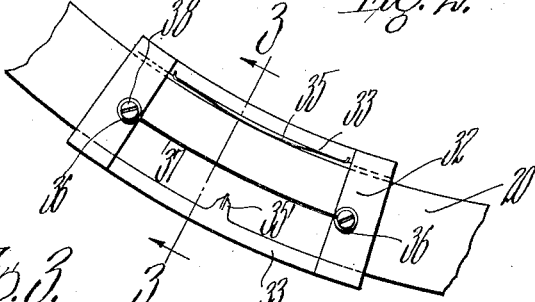
INVENTOR
Henry B. Bartlett
BY Chapin + Neal
ATTORNEYS.

UNITED STATES PATENT OFFICE.

HENRY B. BARTLETT, OF HOLYOKE, MASSACHUSETTS, ASSIGNOR TO B. F. PERKINS & SON, INC., OF HOLYOKE, MASSACHUSETTS, A CORPORATION OF MASSACHUSETTS.

WEIGHING-SCALE.

1,400,933.

Specification of Letters Patent.   Patented Dec. 20, 1921.

Application filed October 3, 1919. Serial No. 328,246.

*To all whom it may concern:*

Be it known that I, HENRY B. BARTLETT, a citizen of the United States of America, residing at Holyoke, in the county of Hampden and State of Massachusetts, have invented certain new and useful Improvements in Weighing-Scales, of which the following is a specification.

This invention relates to improvements in weighing scales.

One object of the invention is to provide improved means for stabilizing the load-receiving member of the scales, such means being characterized in that it is effective to stabilize such member against end sway as well as side sway.

Another object of the invention is to provide, in a weighing scale having a swinging pointer, means to damp the vibrations of such pointer and permit it to be quickly brought to rest in balanced position.

A further object of the invention is to provide, in a weighing scale, generally simplified and improved mechanical structure.

Other objects and advantages will appear in the following description and in the illustrative embodiment of the invention in the accompanying drawings, in which—

Figure 1 is a front elevational view of a weighing scale embodying the invention;

Fig. 2 is an enlarged front elevational view of a portion of the fixed scale, showing the rider thereon for damping the vibrations of the pointer;

Fig. 3 is a cross-sectional view taken on the line 3—3 of Fig. 2;

Fig. 4 is an enlarged fragmentary sectional elevational view, illustrative of a means for suspending the load-receiving member; and Fig. 5 is an enlarged fragmentary sectional elevational view, illustrative of the construction and mounting of the stabilizing link.

Referring to these drawings; the frame of the scales includes a suitable base 6, preferably provided with screws 7 for the purpose of leveling it upon its support. From base 6, a vertical column 8 arises and fixed to, and radiating from, the upper end of the latter are three arms 9, 10, and 11. Suitably connected to arm 9 for swinging movement in a vertical plane is a pointer arm 12 and fixed to such arm to swing therewith is an arm 13, from the free end of which the load-receiving member is suspended. As illustrated, this member consists of a hollow cylindrical basket 14, although the member may be constructed in various other forms, as desired, and centrally fixed to this basket is a stud 15 for connection to the arm 13. The pivotal connection between stud 15 and arm 13 may be made in various ways, one of which is shown in Fig. 4. Thus, the upper end of stud 15 is provided with an eye 16 to receive a knife edge 17 suitably fixed to arm 13. Also fixed to the pointer arm 12 is another arm 18, the free end of which carries a suitably proportioned counterweight 19 to balance the several connected members 12, 13, 14, and 18 about the pivotal connection to arm 9. The fixed arm 10 and the column 8 serve to support between them a quadrant 20, which is graduated in suitable units, as indicated at 21. On the free end of pointer arm 12 is a hollow and generally rectangular frame 22, carrying a transparent member 23, upon which is provided a scratch or cross-hair 24, with reference to which the readings on scale 21 are read.

The structure described may be varied in numerous particulars and still embody the invention, which is concerned primarily with the provision of means for stabilizing the load-receiving member 14 and for damping the vibrations of the pointer arm 12.

The stabilizing means consists of a link 25, which permits basket 14 to move up and down, but constrains it against swaying sidewise or endwise from the perpendicular. The free end of the fixed arm 11 is provided with a sleeve 26 (Fig. 5), the internal diameter of which is such as to closely receive a ball 27 threaded, or otherwise removably secured to, one end of link 25. One end of sleeve 26 is slightly inturned, as at 28, to prevent removal of the ball from such end and to form a curved seat for the ball. The other end of the sleeve is closed by a screw 29, the end face of which just touches the rear face of the ball. Thus, a ball and socket connection is provided between one end of link 25 and the fixed arm 11. The other end of link 25 is connected to a stud 30, which depends from basket 14, in a similar manner, the lower end of stud 30 carrying a sleeve 31 similar to the described sleeve 26. The length of link 25 (taken between the centers of the balls) is equal to the length of arm 13 (taken between its fulcrum and the knife edge 17) and such fulcrum is located vertically above the center of ball 27. The distance between this fulcrum and the center of ball 27 is equal to that between the pivotal connection of basket 14 to arm 13 and the similar connection of the latter to link 25. Thus, the latter moves in parallelism with arm 13 and the basket 14 must needs remain in the desired position,—with the studs 15 and 30 lying in a common vertical plane.

The damping means consists of a rider, which is manually movable along the quadrant 20 and frictionally held thereto. This rider includes a hollow and generally rectangular frame 32, to overlie the front and graduated face of quadrant 20, and upper and lower longitudinally curved and rearwardly extending portions 33, each of which have projections 34 to engage the rear face of quadrant 20 (Fig. 3). The lower portion 33 engages the outer curved edge of quadrant 20, but the upper portion is spaced from the adjacent edge of the latter and a spring, as 35 is interposed between the two. Thus, the rider may be held by frictional engagement to the quadrant 20. Preferably, although not necessarily, a pointer, as 35' is provided on the lower portion 33 to overlie the graduated face of quadrant 20. Projecting forwardly from each end of the rider 32 are studs 36 and a wire 37 extends between the studs, its ends being suitably secured to the latter, as by screws 38. The frame 22 on the end of arm 12 swings freely between the wire 37 and the front face of quadrant 20, but is prevented from undue lateral sway by the wire and quadrant. Likewise, the frame 22 may swing freely between the studs 36, but the rider frame 32 is generally held to quadrant 20 by such a degree of frictional resistance that the extent of swinging movement of the frame is limited by the studs.

In use, the rider is generally in its lower position, wherein the pointer 35' alines with the zero mark on the quadrant scale, as does also the line 24 on the pointer arm. The article to be weighed is placed in basket 14, whereupon the pointer arm is swung upwardly. No wide range of swinging movement is, however, permitted, for the pointer arm is arrested shortly by the engagement of its frame 22 with one of the studs 36 and, upon rebounding, strikes the other of studs 36, which thus confine the movement of the pointer arm within fixed and relatively small limits. In order to determine the weight of the article, the rider must be manually moved along the quadrant to permit the upward swinging movement of the pointer arm, which will bear against the left-hand stud 36 during such operation. The rider is moved until the frame 22 of the pointer leaves the left-hand stud 36 and this indicates to the operator that a balance has been nearly obtained, whereupon the rider is slowly moved until the line 24 alines with the pointer 35'.

The above-described operations can be accomplished with considerable rapidity and, as a practical matter, the correct reading on the graduated quadrant can be determined much more quickly and accurately than with scales of this character which are not provided with the rider. Ordinarily, the pointer will swing over a large arc and then continue to swing back and forth through arcs of progressively decreasing extent and it takes a considerable interval for the pointer to come to rest. In order to get a quick reading, skilled operators estimate where the pointer will eventually come to rest, but, with the use of the rider described, such estimation is not necessary and accurate readings can be quickly obtained, even by unskilled operators, for the vibrations of the pointer arm are limited by the rider to such small degrees that it quickly comes to rest.

The stabilizing link 25 is characterized by simplicity and effectiveness in operation. The ball and socket construction minimizes the effect of friction and, in addition, is important on account of the universal movement afforded the load-receiving member 14. The link 25 is important, where, as here, the basket 14 is suspended from one point and therefore susceptible to end sway, such end sway being as effectively controlled as is the side sway, and both are controlled by the same means.

The invention has been disclosed herein, in an embodiment at present preferred, for the purposes of illustration, but the scope of the invention is defined by the appended claims rather than by the foregoing description.

What I claim is—

1. In combination, a scale, a pointer mounted to swing along and adjacent said scale, and a rider frictionally held to and manually movable along the latter, said rider provided with longitudinally spaced projections extending into the path of the pointer and arranged one on each side of the latter.

2. In a weighing device, a pivoted lever, a load-receiving member pivotally connected thereto, a pointer carried by said lever, a graduated scale over which said pointer is adapted to swing, and a manually operable member movable along said scale and frictionally held thereto, said member having projections extending into the path of and arranged on opposite sides of said pointer.

3. In combination, a scale, a pointer mounted to swing along and adjacent said scale, a rider frictionally held to and manually movable along the latter, said rider provided with longitudinally spaced projections extending into the path of the pointer and arranged one on each side of the latter, and means carried by said rider and coöperating with said scale to confine the pointer between them to limit the lateral sway of the latter.

4. In a weighing scale, a frame, a lever pivoted thereto for swinging movement in a vertical plane, a load-receiving member suspended from said lever, and a stabilizing link connecting said member and frame and having a ball and socket connection with each thereof.

5. In a weighing scale, a frame, a lever pivoted thereto for swinging movement in a vertical plane, a load-receiving member suspended from said lever, and a stabilizing link pivotally connected at one end to said member and at the other end to said frame, said link being so mounted as to swing in parallelism with said lever.

6. In a weighing device, a scale, a pointer mounted for swinging movement along said scale, and a pair of stops carried by said scale and located upon opposite sides of said pointer, and means connecting said stops whereby movement of one of said stops produces an equal movement of the other stop in the same direction.

7. In a weighing device, a fixed frame, a lever provided with a fixed weight at one end and a load receiving member pivotally connected thereto adjacent its opposite end, said lever being mounted for swinging movement in a vertical plane, and a stabilizing link pivotally connected at one end to said load receiving member and at the other end to said frame.

HENRY B. BARTLETT.